United States Patent [19]
George

[11] Patent Number: 4,518,272
[45] Date of Patent: May 21, 1985

[54] POSITION INDICATOR MEANS FOR A HIGH SPEED PRINTER OR THE LIKE

[75] Inventor: Rick A. George, Ithaca, N.Y.

[73] Assignee: NCR Corporation, Dayton, Ohio

[21] Appl. No.: 570,150

[22] Filed: Jan. 12, 1984

[51] Int. Cl.[3] .............................................. B41J 29/42
[52] U.S. Cl. ................................ 400/705.1; 400/322; 400/679
[58] Field of Search ............... 400/320, 322, 342, 351, 400/705.1, 679, 719; 250/561

[56] References Cited

U.S. PATENT DOCUMENTS

| | | | |
|---|---|---|---|
| 3,810,189 | 5/1974 | Casperson et al. | 400/320 X |
| 4,044,881 | 8/1977 | Chai et al. | 400/322 X |
| 4,116,567 | 9/1978 | San Pietro | 101/93.05 X |

*Primary Examiner*—Paul T. Sewell
*Attorney, Agent, or Firm*—Stephen F. Jewett; Robert L. Clark

[57] ABSTRACT

Described is a controlled device such as a printer device, comprising an electrically operated mechanism such as a moveable print head, a scanner for sensing indicia of alignment of the electrically operated mechanism, and an electrical conductor to carry signals by which the mechanism is operated. The electrical conductor is employed to provide the indicia of alignment to be read by the scanner. Included is a description of an electrical conductor which comprises parallel conductive runs made of copper which are spaced apart and supported by a transparent electrically insulative plastic material, thus forming a timing strip on which positional indicia are defined by optical contrast between the runs and the insulative plastic material.

9 Claims, 10 Drawing Figures

POSITION INDICATOR MEANS FOR A HIGH SPEED PRINTER OR THE LIKE

BACKGROUND OF THE INVENTION

This invention relates to controlled devices having an electrically operated mechanism and a scanner for sensing indicia of how the mechanism is positioned or aligned. The invention has special application to printer devices, e.g., high speed printer devices, having an electrically operated print head which is movable relative to record media on which printing is to occur, and a scanner for sensing indicia of alignment or position of the print head relative to the record media.

High speed line printers of the dot-matrix type, for example, typically include a print head which is movable across a paper document in a reciprocating manner for serial printing of selected dot positions in a dot column or row. The print head may be moved by cable and pulley arrangement, a lead screw, or a cam drive or like drive mechanism. A typical print head is mounted for movement on a carriage, and has one or more electrically operated print elements which are actuated or energized at high speed to cause printing of dots by jet-like ejection of ink droplets or movement of print wires attached to solenoids for impact against the paper. In the case of a thermal printer, the print elements are actuated to provide highly localized sources of heat for thermal printing of dots on record media which is heat-sensitive.

The print elements may be arranged in a row for printing a single horizontal line of dots at a time so that a line of printed characters is completed by plural horizontal passes of the print head across the record media. Alternatively, the print elements may be arranged in one or more vertically oriented groups of elements for printing a line of dot-matrix characters with a single print head pass.

When printing begins, the print head is normally moved to the lefthand margin position on the paper document and the print head is then moved from left to right across the document at a substantially constant speed while successively printing dots at selected positions until reaching the righthand margin of the paper to complete a line of print. The print head may then be moved in the reverse direction, that is from right to left, back to the lefthand document margin whereupon the paper document will be advanced in readiness for printing of the next line. In the case of a bi-directional printer, the document is advanced at the conclusion of each print line and printing occurs in both directions of print head movement.

A timing or registration strip with slots or like indicia has been commonly used in high-speed printers to determine rate of movement and position of the print head with respect to the record media for purposes of controlling the printer operation. As the print head is moved, the indicia are sensed by a scanner which provides related electrical feedback signals to control electronics which trigger energization of the print elements with proper timing, and which are sometimes also used to control the speed of the print head movement. Scanner feedback has also been used to signal the left and righthand margin home positions of the print head to time reversals in direction of the print head movement, document advancement and related controlled printer operations.

Various types of scanners are known, and the known scanners include magnetic readers and optical scanners. Optical scanners generally use a light source such as a light-emitting diode, and light detection means such as a photodiode or a phototransistor. For a reflective type of optical scanner, the light source and the light detection means are positioned on the same side of the timing strip, and the light detection means detects light from the light source which indicia on the timing strip reflect back. A reflective type optical scanner may be used with a timing strip having indicia such as a bar code, where the light detection means is used to detect variations in light which the timing strip reflects. A transmissive type of optical scanner may be used with a timing strip provided with indicia such as a series of slots or like transparent areas, and the light detection means is in that case used to detect variations in light which is transmitted through the timing strip upon being emitted by the light source. The output of a typical scanner is often an analog current signal which can be converted to a voltage signal and amplified and digitized to produce a digital voltage signal for processing by control electronics according to known means.

Examples of U.S. patents which describe printer devices having movable electrically operated print heads, and timing strips, scanners and related control electronics, are U.S. Pat. No. 3,970,183, issued July 20, 1976, to Robinson et al.; U.S. Pat. No. 4,050,563, issued Sept. 27, 1977, to Menhennett; U.S. Pat. No. 4,204,777, issued May 27, 1980, to Jen; and U.S. Pat. No. 4,208,137 issued June 17, 1980 to Liu; and the descriptions and drawings in these patents are hereby fully incorporated herein by reference for informational purposes. U.S. Pat. No. 3,849,632 issued Nov. 19, 1974, to Eckert, Jr., et al., describes a reflective type optical scanner and related circuitry, and the description and drawings in this patent are likewise hereby fully incorporated herein by reference.

In a typical printer device having a movable print head, the print elements which are part of the print head are electrically actuated by signals carried by an electrical conductor which is operatively connected at one end to the print head. The other end of the electrical conductor is operatively connected to control electronics which may be in a fixed position with respect to the printer device frame. Since the movement of the print head is relative to the frame, it is common to provide the required electrical conductor in the form of a flexible circuit. The flexible circuit may comprise a number of electrically conductive runs made of copper or copper alloy arranged adjacent one another in parallel spaced-apart relationship and supported by a plastic electrically-insulative material. Common insulative materials for this purpose are Mylar and Kapton type plastics, which are known for their flexibility, flex life and resistance to heat.

SUMMARY OF THE INVENTION

In an embodiment of this invention, a controlled device comprises an electrically operated mechanism, a scanner for sensing indicia of alignment of the mechanism, that is, indicia of the relative alignment or position of the mechanism, and an electrical conductor to carry signals by which the mechanism is operated, where the conductor is specially employed to provide such indicia of alignment to be sensed by the scanner.

For this invention, the controlled device may be a printer device such as a high speed dot-matrix type printer or other type printer having an electrically operated print head which is movable relative to record media such as a paper document on which printing is to occur. The printer device may be an ink jet type printer, a mechanical impact type printer, a thermal type printer or other type printer having a scanner for sensing indicia of alignment of the print head relative to the record media. In accordance with this invention, an electrical conductor is connected to operate the print head, while at the same time it is employed to provide the indicia of print head alignment to be sensed by the scanner.

Any type of scanner may be used with this invention, including magnetic reader and optical types, the selection of a scanner type being subject to considerations of cost and the type of indicia which the scanner is to sense. Such indicia may be of the type which are either magnetically or optically readable. Optically readable indicia may be readable by reflective type optical scanners, as in the case of a line of bar code on a stick-on label; or they may be of the type which are readable by transmissive type optical scanner, as in the case of a line of slots or transparent windows separated by alternating areas which are opaque.

In a presently preferred embodiment of this invention, a special electrical conductor is provided. The conductor comprises one or more electrically conductive runs supported by an electrically insulative material, and alignment indicia are defined by optical contrast between the runs and the insulative material. For use with a transmissive type optical scanner, the electrical runs may be made optically opaque, such as by using runs made of copper or copper alloy, and the insulative material may be made essentially optically transparent, such as by using a transparent flexible heat-resistant plastic, such as a Mylar or Kapton type plastic.

Accordingly, one object of this invention is the mechanical simplification of controlled devices such as printer devices having an electrically operated mechanism, such as a movable print head, a scanner for sensing indicia of alignment of such mechanism, and an electrical conductor to carry signals by which such mechanism is operated.

Another object of this invention is to avoid the necessity for a separate timing strip, separate timing strip mounting means, or alignment of a separate timing strip with controlled devices or printer devices of the type just described.

Still another object of this invention is to minimize the production costs of such devices.

DETAILED DESCRIPTION OF THE PRESENTLY PREFERRED EMBODIMENTS

Figure 1:
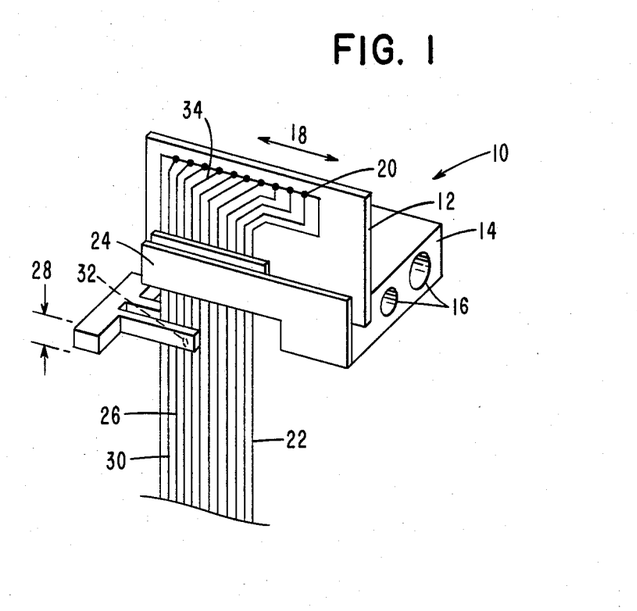
FIG. 1 shows a configuration for a carriage position sensing system in use with a thermal-type print head in accordance with this invention.

The presently preferred embodiments of this invention relate to printer devices, particularly high speed dot matrix type printer devices, such as thermal printers, ink jet printers and dot matrix impact type printers. FIG. 1 illustrates a presently-preferred embodiment of this invention in the form of an assembly 10 which is part of a thermal type printer device.

The assembly 10 comprises a thermal print head 12 which is in the form of a printed circuit board mounted to a movable carriage assembly 14. The carriage assembly 14 has a pair of guide holes 16 for movement along a pair of rails (not shown) or the like in the directions 18 illustrated in FIG. 1. The print head 12 and the carriage assembly 14 are thus movable relative to record media on which printing is to occur. The print head 12 has a total of ten print elements, the electrical connections 20 for which are shown on the backside of the circuit board 10 in FIG. 1. Electrical conductive runs 34 connect each print head connector 20 to respective conductive runs 26. The ten print elements are laid out in a horizontal row and spaced apart so that the print head 12 may be used, for example, to print a 40 character long line of dot matrix characters, with each print element printing four such characters in a line of print.

The electrically operated print head 12 is connected to an flexible electrical conductor 22 in the form of a ribbon-like cable or circuit which carries the signals by which the print head 12 is operated. The conductor 22 has connections soldered to the print head 12 in a conventional manner, and is further secured to the print head 12 by means of a clamping bracket 24 fastened to the print head 12 by screws or other means.

The flexible electrical conductor 22 comprises eleven electrically conductive runs 26 inclusive of an input lead for energizing each of the ten print elements and an eleventh conductive run 26 which leads to ground. Over a distance 28, representing a scanner sensing area, each of the runs 26 is arranged adjacent one another in parallel spaced apart coplanar relationship supported by an electrically insulative material 30 which is essentially optically transparent. The conductive runs 26 are essentially optically opaque, and are preferably made of copper or copper alloy or equivalent conductive material. The essentially transparent insulative material 30 is preferably made of a flexible heat-resistant plastic, such as a Mylar or Kapton type of plastic, so that the electrical conductor 22 is in effect a flexible circuit. Such flexible circuits are well-known and are used to accommodate relative movement between a movable print head and stationary control electronics (not shown) which are interconnected by the flexible circuit.

As shown in FIG. 1, the assembly 10 includes a scanner which is in the form of a transmissive type optical scanner 32 comprising a light emitting diode or LED 33A and a phototransistor 33B (shown only in FIG. 2A) disposed respectively on opposite sides of the electrical conductor 22. The scanner 32 is thus mounted to sense the alternating clear and opaque spaces which are defined by optical contrast between the electrical runs 26 and the insulative material 30. These alternating spaces provide indicia of alignment or position of the print head 12, to represent the position of the print head 12 over the constant velocity area of movement of the carriage 14 with respect to the record media (not shown). The scanner 32 is mounted to sense the indicia of alignment provided by the electrical conductor 22 and to feedback related signals representing the location of the print head 12 to conventional control electronics (not shown).

When the printer device is operated, the conductive runs 26 interrupt the light emissions of the scanner 22 diode, whereas the clear spaces formed by the insulative material 30 will allow the phototransistor of the scanner 32 to detect the light which such diode emits. In other words, the scanner 32, being fixed with respect to the printer frame (not shown), senses alternating light beam interruptions caused by the conductive runs 22 as the print head 12 is shuttled horizontally while printing upon a paper document. For the assembly illustrated in FIG. 1, it may be expedient to anchor or clamp the electrical conductor 22 to the thermal print head 12 at points on both sides of the scanner sensing area 28 to ensure that the electrical conductor 22 moves with the print head and does not buckle or twist in the area 28.

Figure 2A:
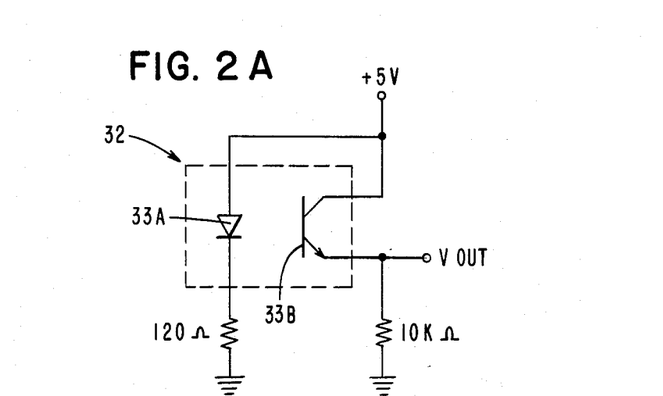
FIG. 2A shows a schematic for a transmissive type optical scanner circuit which may be used with the sensing system shown in FIG. 1.
Figure 2B:
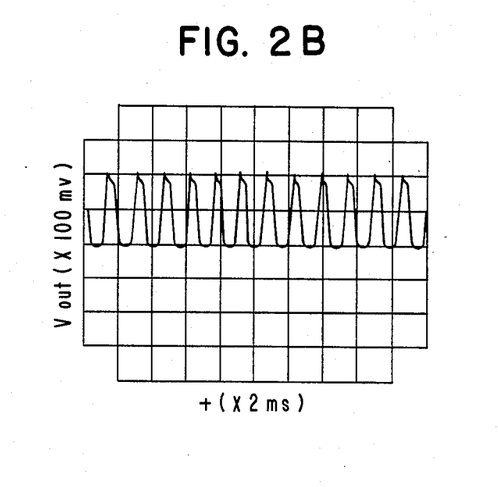
FIG. 2B shows a typical output signal of the circuit shown in FIG. 2A on scanning of an electrical conductor comprised of parallel copper runs separated by transparent Kapton type plastic.

When configured as schematically shown in FIG. 2A, the scanner 32 will produce a signal similar to that shown in FIG. 2B. In a manner which is well known, this signal can be converted to an analog voltage signal and then amplified and digitized to produce a digital signal for conventional use by control electronics. Through the control electronics, the digital signal input can be used to control motor speed for horizontal shuttling of the print head and to energize the print elements of the print head at the proper time for accurate printing of the dot matrix characters.

Figure 3A:
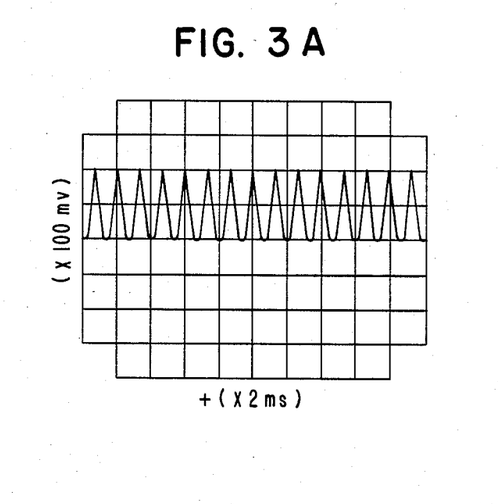
FIGS. 3A and 3B respectively illustrate exemplary outputs of the circuit shown in FIG. 2A when used for scanning a conventional type timing strip (FIG. 3A), and for scanning a special electrical conductor type timing strip (FIG. 3B) of the type shown in FIG. 1.
Figure 3B:
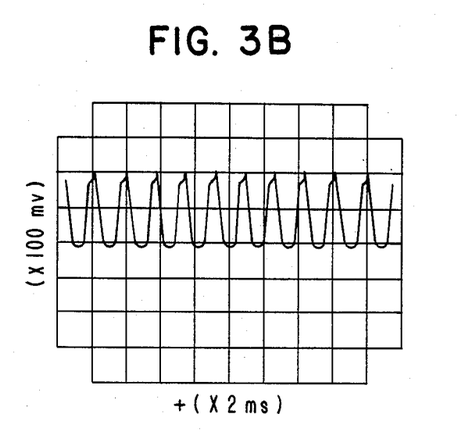

Using a scanner circuit as shown in FIG. 2A, the waveforms shown in FIGS. 3A and 3B were produced to compare the scanner output for a conventional type timing strip (FIG. 3A) to the output for a Kapton (polyimide) type plastic flexible circuit used as a timing strip (FIG. 3B). The conventional type timing strip was a plastic type provided with alternating dark (black) and clear spaces each 0.007 inches in width. The Kapton plastic flexible circuit was of a type having 0.020 inch wide copper runs, each spaced 0.005 inches apart by the clear Kapton plastic.

Figure 4:
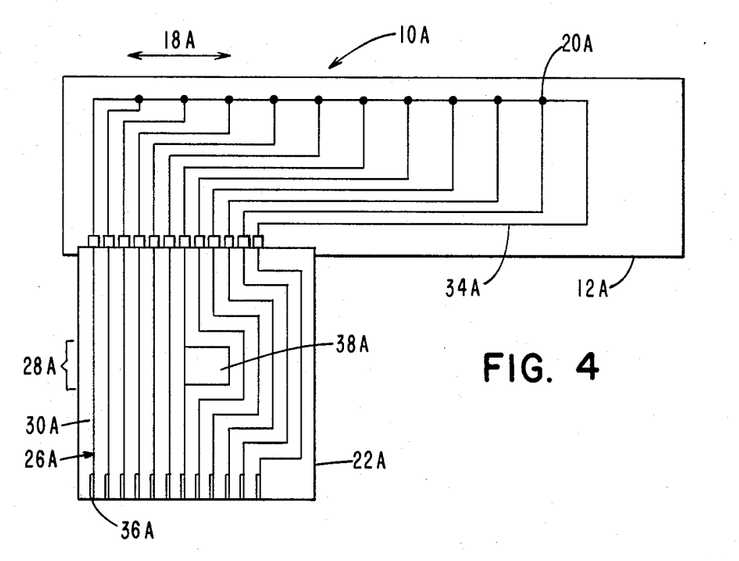
FIG. 4 shows a thermal-type print head connected with a special electrical conductor by which timing indicia are provided by parallel copper runs with one run being widened to represent a print head home position.

FIG. 4 shows a thermal print head assembly 10A which is similar to that shown in FIG. 1. The assembly 10A shown in FIG. 4 has a thermal print head 12A for which ten connections 20A for respective print elements and related electrical conductive runs 34A are shown. Also shown in FIG. 4 is a flexible circuit 22A having at one end electrical conductive runs 26A with widened ends 36A to facilitate connection to control electronics and transparent insulating material 30A. It will be seen in FIG. 4 that one of the electrical runs 26A has an expanded area 38A within the scanner sensing area 28A. The expanded area 38A is in this case intended to be the last area of optical contrast to be sensed by the scanner, and is accordingly of different width compared with the other areas of optical contrast provided by electrical runs 26A within the scanner sensing area 28A. The expanded area 38A may thus be used to provide indicia representing the right hand margin home position for the print head 12A. In other words, the expanded area 38A will be used to indicate the right hand "turnaround" area for the print head 12A over which the print head 12A velocity will decrease from a constant velocity from left to right to a zero velocity, at which point the print head 12A will subsequently have its speed increased to a constant velocity in the right to left direction. While not shown, one of the other electrical runs 26A may be provided with an expanded area 38A in a similar fashion, so that the first area of optical contrast to be sensed by the scanner will be of different width compared with that of the other runs 26A, to provide indicia for representing the left hand margin home position for the print head 12A.

By fixing the number of electrical runs 26A and their spacing, the electrical conductor 22A may be employed to provide indicia of alignment of the print head 12A to signal any combination of positions for characters, dots and half-dots in printing of dot matrix characters. As is well known in the art, bidirectional printing is facilitated by providing a timing strip with alternating opaque and transparent areas of equal width.

Figure 5:
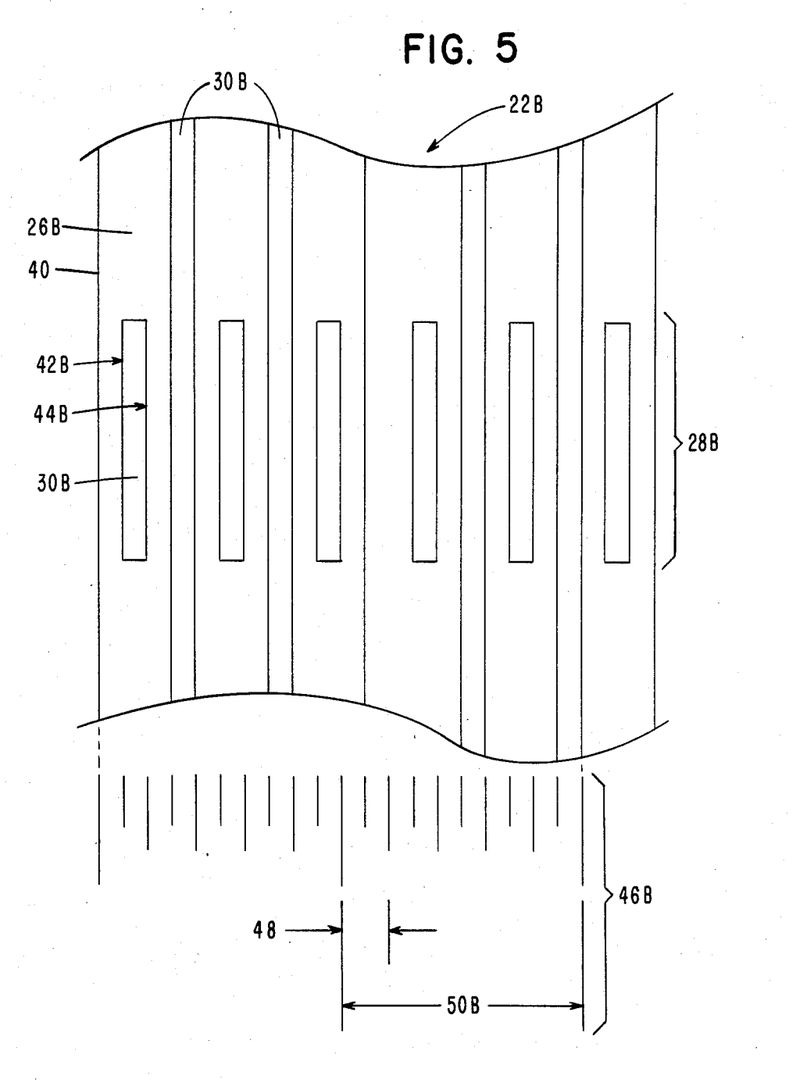
FIG. 5 illustrates a section of special electrical conductor which, in accordance with this invention, provides indicia for printing of ten-dot wide dot matrix characters.

FIG. 5 shows a section of electrical conductor 22B adapted for sensing of full dot and half-dot positions for a bidirectional printer device for printing dot matrix characters. (Reference to full dot and half dot positions for character printing is well known, with a half dot position indicating the position between two full dot positions. Dots may be printed at either half dot or full dot positions.) FIG. 5 shows a conductive run 26B with its leading edge 40 representing the location of the first full dot position for the first matrix character to be printed. That electrical run 26B has at its center line a cut-out portion defined by edges 42B and 44B which is filled in by the essentially transparent insulative material 30B, so that there are four optically contrasting transitions between the run 26B and the insulative material 30B to define indicia representing dot and half-dot positions. Each of the other electrical runs 26B illustrated in FIG. 5 similarly have cut-out portions within the scanner sensing area 28B. Edge 42B represents the location of the first half-dot position for the first dot matrix character and edge 44B thus represents the location of the second full dot position for that same character. Referring to the scale 46B shown at the bottom of FIG. 5, the width 48 represents the distance between adjacent full dot positions and the distance 50B represents the width of the dot matrix characters where two half dot positions and one full dot position will represent the spacing between characters. The illustrated configuration for the electrical conductor 22B can be used for printing a ten dot wide character matrix, for which there are five full dot locations and five half-dot locations and only the first four full dot locations are to be printed.

Figure 6:
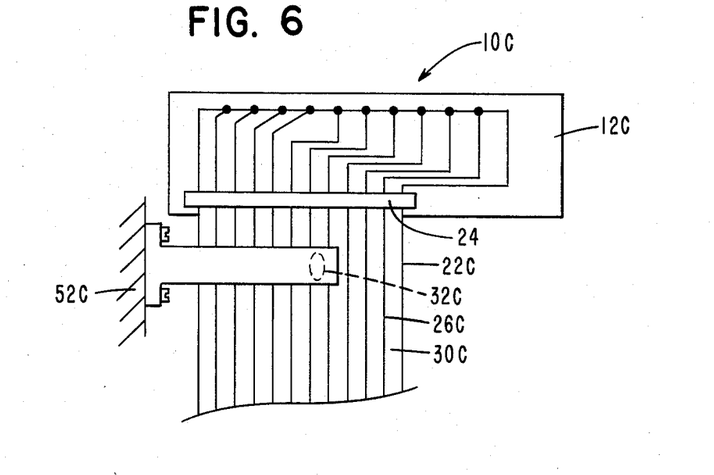
FIG. 6 illustrates a means for mounting a transmissive type optical scanner for use in conjunction with a thermal print head and electrical conductor as shown in FIGS. 1 and 4.

FIG. 6 illustrates an assembly 10C for a high speed thermal dot matrix type printer similar to the designs previously described. The assembly 10C shown in FIG.

6 comprises a thermal print head 12C, a flexible circuit 22C and a transmissive optical interrupt type of scanner 32C similar to the optical sensor 32 shown in FIG. 2. The flexible circuit 22C with its electrical conductor runs 26C and the optically transparent material 30C is mounted for use as a character position sensor strip in a moving print head type thermal printer. Having the flexible circuit 22C act as the character position sensor strip eliminates the need for a separate sensor strip and associated holder and mounting means. The assembly 10C shown in FIG. 6 uses an interrupt type scanner 32C, shown mounted to the stationary printer frame 52C, although other types of scanners might be employed.

In the design of an electrical conductor for use in a printer device in accordance with this invention, the electrical conductor may comprise a plurality of electrically conductive runs to be sensed as indicia of character position (as opposed to dot position), for example, with each of the runs being spaced according to the character spacing desired. Thus, for a 20 print element print head, indicia representing two character positions could be used for printing a 40 character line of print. Alternatively, the runs may be configured for sensing of dot positions to be printed for printing of dot matrix type characters. Indicia representing 50 full dot positions and 50 half-dot positions could be used for printing a 40 character line of print with a four element print head bidirectionally printing 10×7 dot matrix characters.

Figure 7:
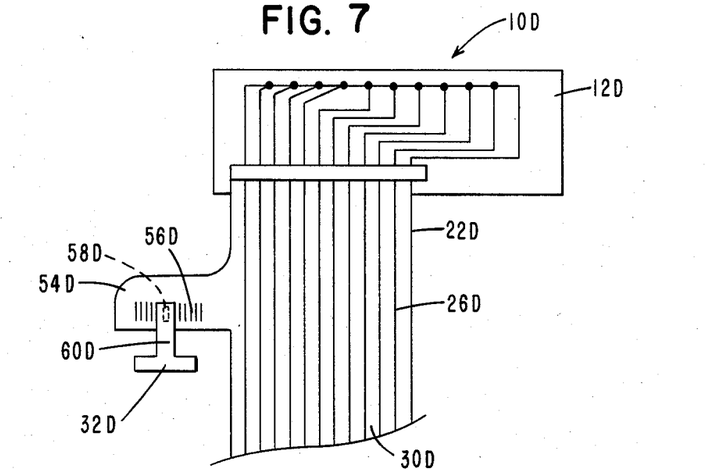
FIG. 7 illustrates a variation of an electrical conductor and scanner configuration which may be used in accordance with this invention.

FIG. 7 illustrates an assembly 10D for a high-speed thermal type dot matrix printer, wherein the electrical conductor, in the form of a flexible circuit 22D, is provided with an extended area 54D with alternating runs 56D of copper or copper alloy spaced apart by essentially transparent plastic insulative material 30D. The runs 56D may be electrically a part of the conductive runs 26D which are connected to operate the print head 12D, or they may be separate. The design illustrated in FIG. 7 lends itself for use with a scanner 32D of a type with a light transmissive sensing slot 58D oriented parallel to the bracket leg 60D of the scanner 32D as depicted.

Figure 8:
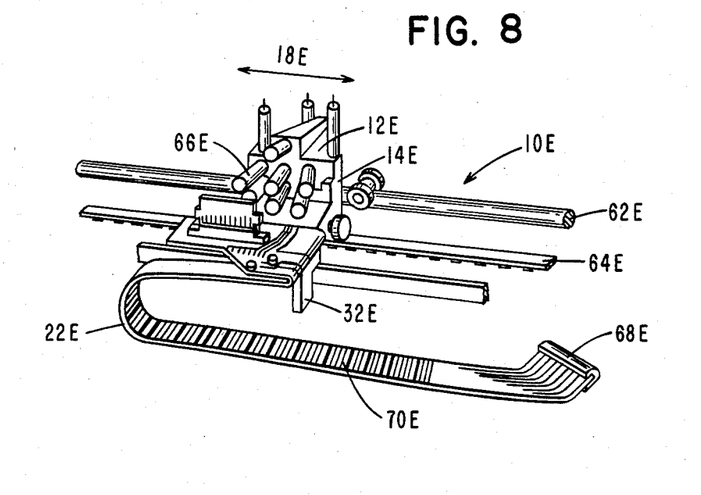
FIG. 8 illustrates an embodiment of the invention in which an optical scanner may be mounted for movement with the print head in a high-speed printer device.

FIG. 8 shows an assembly 10E for a high-speed impact type dot matrix printer having a print head 12E mounted for shuttle type movement on a carriage 14E along rail 62E by means of an endless toothed belt 64E connected to a controlled motor drive (not shown). The assembly 10E shown in FIG. 8 has an electrical conductor 22E connected to the print head 12E at one end, to carry signals to operate the electrically operated print head 12E, by supply of signals to energize solenoids 66E which drive print wires for impact against the record media (not shown) for printing of dots forming dot matrix characters. At one end 68E, the electrical conductor 22E is fixed relative to the printer frame (not shown) for interface with the control electronics (not shown).

The assembly 10E shown in FIG. 8 is configured such that the scanner, in the form of a reflective type optical scanner 32E, is mounted to the carriage 14E in a position which is fixed relative to the print head 12E. As illustrated in FIG. 8, the electrical conductor 22E is provided along a substantial portion of its length with indicia of alignment which are in the form of a line of bar code 70E which are oriented transversely to the length of the electrical conductor 22E. The bar code 70E may be provided on the electrical conductor 22E by any expedient means, such as by means of a stick-on label. In the illustrated configuration, the electrical conductor 22E is mounted so that when sensed by the optical scanner 32E the bar code 70E have positions which are fixed relative to the record media (not shown) during printing of a line of print. During printing, the record media or paper document is supported by a platen (not shown) or the like to support an area of the document for printing thereon. The impact print head 12E is electrically operated for impact printing on the area of the document supported by the platen, with the print head 12E being horizontally movable with respect to the platen in the directions shown by 18E in FIG. 8 for printing a line of print. For further details concerning exemplary construction and mode of operation for a printer of the type shown in FIG. 8, including control electronics which may be used therewith, reference is made to the U.S. patent issued to Robinson et al. identified previously herein. For a more detailed description of reflective type optical scanners, such as the scanner 32E shown in FIG. 8, and related circuitry for producing digitized voltage outputs for such scanners, reference is made to the U.S. patent issued to Eckert, Jr., et al. previously identified herein.

While various embodiments of this invention have been illustrated and described, it should be apparent that the invention may be otherwise practiced in the form of other embodiments. It will be thus understood that this invention is defined and limited only by the scope of the following claims.

What is claimed is:

1. A printer device which comprises:
   an electrically operated print head which is movable relative to record media on which printing is to occur;
   a scanner for sensing indicia of alignment of the print head relative to the record medium; and
   an electrical conductor connected to operate said print head, wherein said electrical conductor comprises an electrically conductive run which is supported by an electrically insulative material; and wherein said indicia are defined by optical contrast between said run and said insulative material.

2. A device according to claim 1 wherein said run is essentially optically opaque; and wherein said insulative material is essentially optically transparent.

3. A device according to claim 2 wherein said run is made of copper or copper alloy; and wherein said insulative material is made of flexible heat-resistant plastic.

4. A device according to claim 1 wherein areas of optical contrast are of equal width to facilitate bidirectional sensing by the optical scanner.

5. A device according to claim 4 wherein first and last areas of optical contrast to be sensed by the scanner are of different width compared with the other areas of optical contrast, to provide indicia for representing home positions.

6. A printer device which comprises:
   an electrically operated print head which is movable relative to record media on which printing is to occur;
   a scanner for sensing indicia of alignment of the print head relative to the record media; and
   an electrical conductor connected to operate said print head, wherein said electrical conductor comprises a plurality of electrically conductive runs, each of which is essentially optically opaque, said runs over a distance being arranged adjacent one another in parallel spaced-apart co-planar relationship, and said runs being supported over said distance by an electrically insulative material which is essentially optically transparent; and wherein said indicia are defined by optical contrast between said runs and said insulative material.

7. A device according to claim 6 wherein each of said runs has at its center line a cut-out portion filled in by said insulative material, so that for each of said runs there are four optically contrasting transitions between the run and the insulative material to define said indicia.

8. A printer device comprising:
a an electrically operated print head;
an optical scanner for sensing a line of indicia to control alignment of the print head with respect to record media; and
an electrical conductor connected to carry electrical signals to operate said print head, wherein said electrical conductor comprises an electrically conductive run which is supported by an electrically insulative material; and wherein said indicia are defined by optical contrast between said run and said insulative material.

9. A dot matrix printer device, which comprises:
a platen, to support an area of record media for printing on said area;
an electrically operated print head for printing on said area, said print head being horizontally movable with respect to said platen, for printing a line of print;
a flat, strip-like electrical conductor operatively connected to said print head to operate said print head, said conductor having a line of optically readable indicia thereon, there being indicia for each dot position on said line of print, said indicia being spaced apart with the same spacing as the dot spacing for characters in said line of print; and
an optical scanner which is mounted for movement along said line of indicia as said print head is moved relative to said platen, said optical scanner being adapted to optically sense said indicia to attain proper alignment of said print head relative to said platen for printing a line of characters.

* * * * *